United States Patent
Simmel et al.

[11] Patent Number: 6,092,569
[45] Date of Patent: Jul. 25, 2000

[54] PRODUCT DISPENSING SYSTEM

[75] Inventors: Thomas L. Simmel, Milford; David R. Auerbach, West Redding, both of Conn.

[73] Assignee: Link Research & Development, Inc., Milford, Conn.

[21] Appl. No.: 09/329,037

[22] Filed: Jun. 9, 1999

Related U.S. Application Data

[62] Division of application No. 08/905,638, Aug. 4, 1997, Pat. No. 5,937,920.

[51] Int. Cl.$^7$ .................................................. B65B 1/06
[52] U.S. Cl. ................................ 141/231; 141/2; 141/18; 141/9; 141/100
[58] Field of Search .............................. 141/2, 9, 18, 21, 141/231, 100, 346, 351–354, 364, 375

[56] References Cited

U.S. PATENT DOCUMENTS

| | | | |
|---|---|---|---|
| 5,379,812 | 1/1995 | McCunn et al. | 141/346 |
| 5,425,404 | 6/1995 | Dyer | 141/351 |
| 5,651,398 | 7/1997 | Decker et al. | 141/18 |
| 5,765,605 | 6/1998 | Waymire et al. | 141/100 |

*Primary Examiner*—J. Casimer Jacyna
*Attorney, Agent, or Firm*—Melvin I. Stoltz

[57] ABSTRACT

By employing a product dispensing head assembly securely mounted to a storage container, within which desired flowable material is retained, with the head assembly being movable into a plurality of alternate positions, the controlled, measured, dispensing and delivery of any desired flowable product is attained. In the preferred embodiment, the product dispensing head assembly incorporates automatic locking means which are automatically engaged when the product dispensing head assembly is in the closed position. Furthermore, a special dispensing coupling is preferably employed to effectively disengage the locking means, thereby providing assurance that no individual can obtain unauthorized access to the flowable material stored within the closed and sealed container. In addition, the product dispensing head assembly is constructed with measuring means integrally formed therewith which is movable between a plurality of alternate positions, thereby dispensing precisely desired, measured quantities of the flowable material.

14 Claims, 11 Drawing Sheets

PRODUCT DISPENSING SYSTEM

RELATED APPLICATIONS

This application is a divisional of U.S. patent application Ser. No. 08/905,638, filed Aug. 4, 1997 entitled Product Dispensing System, now U.S. Pat. No. 5,937,920.

TECHNICAL FIELD

This invention relates to dispensing systems for transferring products from one container to another and, more particularly, to a dispensing system for flowable materials.

BACKGROUND ART

For many years, safe, trouble-free delivery or transferral of various materials, particularly toxic or hazardous materials, has long been a problem which has plagued the industry. In particular, in situations where small quantities of such materials are to be transferred from a storage container to an active, usable reservoir, such as a holding tank wherein the materials are diluted for use, the difficulties typically encountered with transferring these products become most acute.

In an attempt to reduce or eliminate these difficulties, various systems or adaptors have been developed. However, these prior art systems have failed to eliminate or overcome the inherent problems or dangers.

Some of the most acute problems occur with the transferral or dispensing of flowable products or materials. Principally, flowable materials comprise small-size particles, solids, pellets, and the like. Most often, these products are formed as concentrated chemicals to be added into a diluting solution, typically water, for intermixture therewith and subsequent applications to a particular item or surface. One area in which products of this nature are frequently employed is the agricultural field, which includes commercial and large-scale turf and ornamental applications where grass, plants, and the like are grown for sale or for maintenance. This area also encompasses golf courses, wherein large grass areas must be carefully maintained.

In employing these flowable products, extreme care must be exercised due to the concentrated, toxic nature of the flowable materials. In addition, care must be exercised in dispensing these products from a storage vessel to a delivery container or dilution vessel, in order to assure that proper delivery of the concentrated material is achieved, as well as proper dilution and mixing. In many instances, the introduction of excess flowable material into the dilution container can cause an overly concentrated spray to be applied, which can either damage the plants, grass, etc. to which it is applied. In addition, harm to the environment may also result due to the run off of concentrated solutions into ground water supplies.

Although the need for carefully measuring and dispensing such flowable products from a storage vessel to the dilution tank or container has been well known in the prior art, no system has been developed for successfully, efficiently, and repeatedly delivering precisely measured quantities of the material on a repeatable production basis. As a result, the quantities being delivered are not precisely accurate and spillage of the products onto the surrounding area often occurs. These inherent problems have consistently caused difficulties and potential harm to the environment as well as to individuals.

Therefore, it is a principal object of the present invention to provide a dispensing system for flowable materials which operates in a completely closed manner.

Another object of the present invention is to provide a dispensing system for flowable materials having the characteristic features described above which is capable of dispensing measured quantities of the flowable material, assuring the transfer of precise amounts.

Another object of the present invention is to provide a dispensing system having the characteristic features described above which completely eliminates spillage and excessive dosing.

Another object of the present invention is to provide a dispensing system having the characteristic features described above which is completely safe and operates in an error-free manner.

A further object of the present invention is to provide a dispensing system having the characteristic features described above which provides positive, flow control means to assure that the flowable material is delivered only when safe to do so.

Other and more specific objects will in part be obvious and will in part appear hereinafter.

SUMMARY OF THE INVENTION

By employing the present invention, all of the difficulties and drawbacks found in the prior art are completely overcome and a dispensing system is achieved which is capable of producing the transfer of measured dosages of a flowable product from a storage container to a dilution container in a completely closed, spill-free manner. Furthermore, by employing the present invention, repeated distribution of measured dosage can be made in order to assure the dispensing of a precise quantity of product from the storage vessel to the dilution container.

In order to attain this controlled, measured, dispensing and delivery of any desired flowable product, the present invention employs a product dispensing head assembly which is securely mounted to a storage container within which the desired flowable material is retained. As discussed above, since such flowable materials are often highly concentrated and toxic, the product dispensing head assembly of the present invention is preferably securely affixed to the portal of the storage vessel in a manner which prevents the removal of the head assembly from the storage vessel. In this way, controlled distribution of the product from the storage vessel is attained and implemented only by authorized personnel.

In order to assure the flowable product retained in the storage vessel is distributed only at the desired times, and is otherwise inaccessible, the product dispensing head assembly of the present invention incorporates automatic locking means which are automatically engaged when the product dispensing head assembly is in the closed position. By requiring a special dispensing coupling to be employed to effectively disengage the locking means, assurance is provided that no individual can obtain unauthorized access to the flowable material stored within the closed and sealed container. Only by employing the proper coupling is one able to disengage the locking means of the product dispensing head assembly of the present invention and activate the distribution of the product from the storage container to the dilution container.

Furthermore, in order to assure that precisely measured quantities of the flowable material are dispensed from the storage vessel into the dilution container, when desired, product dispensing head assembly incorporates measuring means integrally formed therewith which is movable between a plurality of alternate positions. In one position, the measuring means is capable of receiving the flowable material from the storage vessel while preventing any passage of the flowable material into the dilution tank or container. In a second position, the measuring means is positioned to dispense the material retained therein into the dilution tank, while being sealed to prevent any further transfer of material directly from the storage vessel itself. In this way, controlled quantities of the flowable material are quickly and easily transferred from the storage vessel directly into the dilution tank with complete ease and simplicity.

In order to further enhance the usability of the product dispensing head assembly of the present invention, the assembly also incorporates a product dump position wherein direct access into the interior of the storage container can be attained. In this position, all of the product retained in the storage vessel can be dispensed into a desired receiving container or, alternatively, the storage container can be refilled from a supply center once all of the product has been dispensed therefrom.

By achieving a product dispensing head assembly having these plurality of alternate positions, in addition to a securely locked position, a dispensing system is realized which provides complete controlled distribution of flowable materials by only authorized personnel and only into suitable containers incorporating an adaptor for unlocking the locking means of the head assembly. As a result, complete control over the distribution of the flowable material is attained as well as precise measured distribution of the product when desired. In this way, all of the difficulties and drawbacks found in the prior art have been completely overcome and a product dispensing head assembly capable of satisfying all of the industry needs and expectations is attained.

The invention accordingly comprises an article of manufacture possessing the features, properties, and the relation of elements which will be exemplified in the article hereinafter described, and the scope of the invention will be indicated in the claims.

THE DRAWINGS

For a fuller understanding of the nature and objects of the invention, reference should be had to the following detailed description taken in connection with the accompanying drawings, in which.

DETAILED DESCRIPTION

Figure 1:
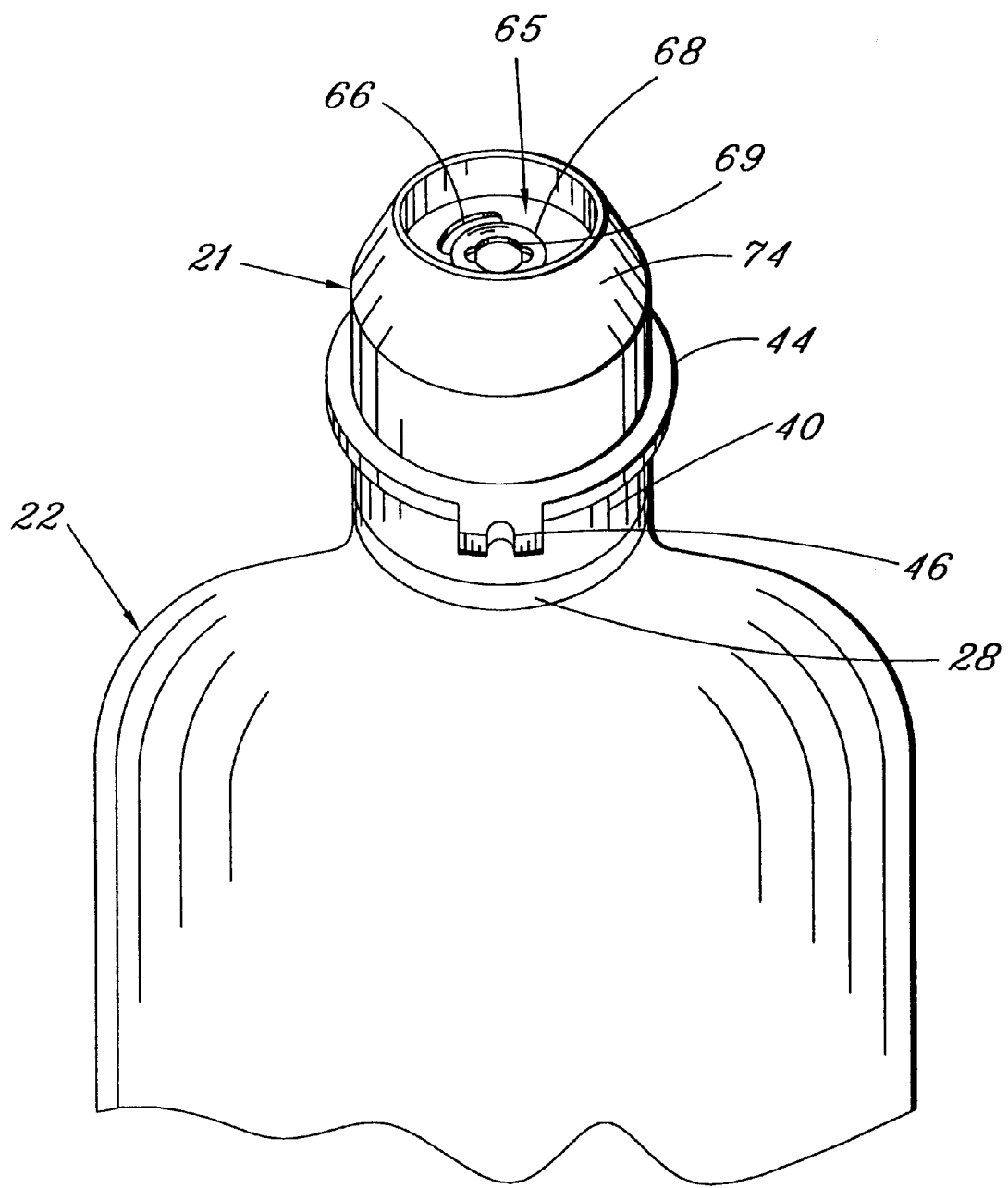
FIG. 1 is a perspective view of the product dispensing head assembly of the dispensing system of the present invention securely mounted to a container incorporating the flowable material to be dispensed.

By referring to FIGS. 1–13, along with the following detailed disclosure, the construction and operation of the preferred embodiment of the present invention can best be understood. Although these drawings and the following disclosure fully detail the preferred construction of the present invention, alternate constructions can be made without departing from the scope of the present invention. Consequently, it is to be understood that FIGS. 1–13, as well as the following detailed discussions, are provided for exemplary purposes and are not intended to limit the present invention to the specific embodiment shown and detailed herein.

As shown in FIGS. 1–5, dispensing system 20 of the present invention comprises a product dispensing head assembly 21, securely mounted to a storage container or vessel 22, and a receiving coupling or adaptor 23, mounted to a dilution container 24. By employing these components, a unique, dispensing system is attained which is capable of delivering measured quantities of any desired flowable material in a precisely controlled manner.

As more fully detailed below, product dispensing head assembly 21 is normally maintained in a closed and locked position, requiring the telescopic interengagement of product dispensing head assembly 21 with receiving coupling/adaptor 23, as diagrammatically depicted in FIG. 2, in order to activate product dispensing head assembly 21 and enable product dispensing head assembly 21 to be moved into its alternate positions. In this way, the flowable material retained within storage container/vessel 22 is incapable of being dispensed into any desired container. Only authorized containers, which incorporate the specifically constructed receiving coupling/adaptor 23, are capable of mating engagement with product dispensing head assembly 21 to activate product dispensing head assembly 21 to dispense the desired product.

Figure 2:
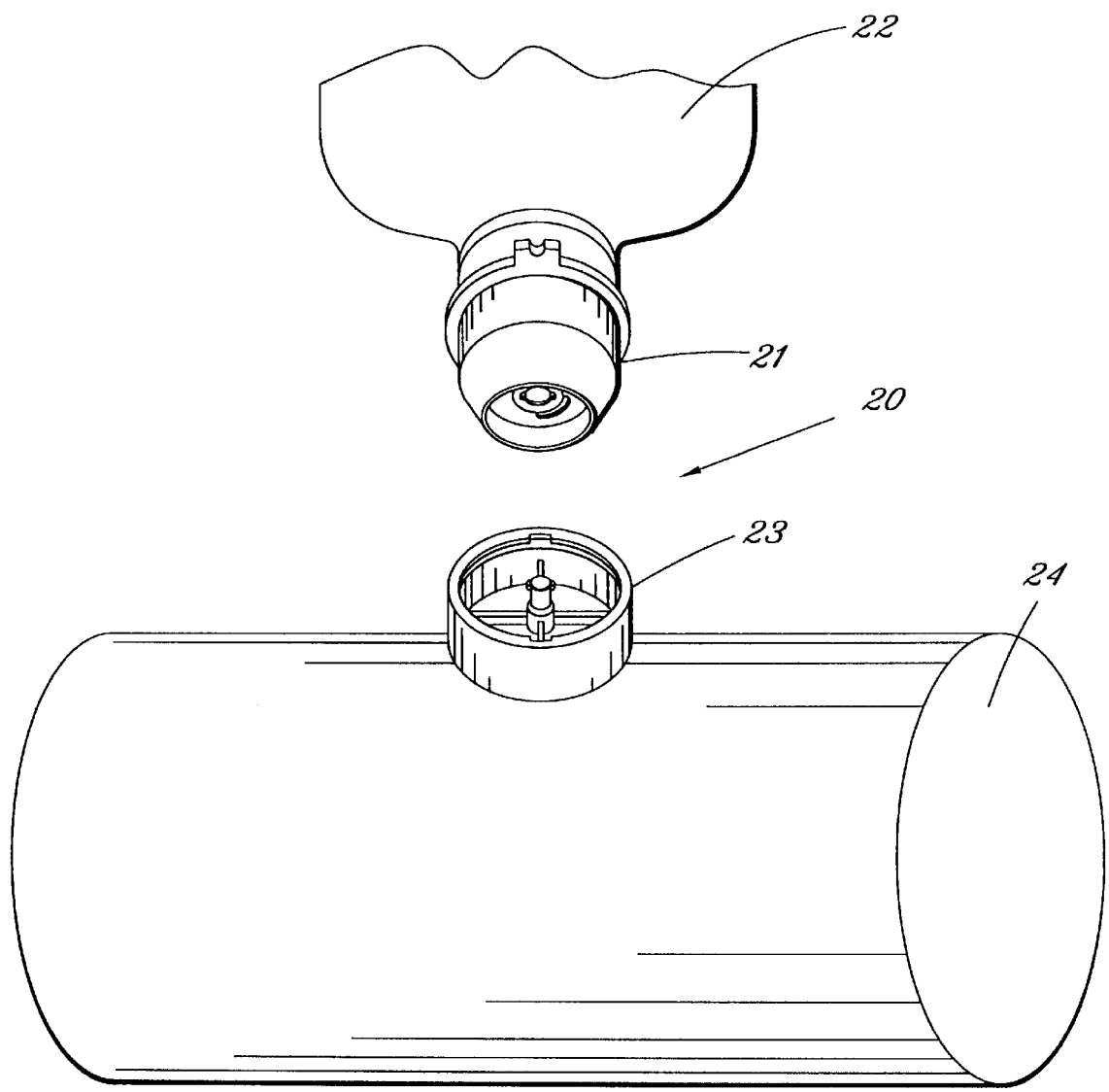
FIG. 2 is a diagrammatic perspective view showing the dispensing system of the present invention, with the product dispensing head assembly in the process of being engaged with the receiving coupling or adaptor.

In this regard, as shown in FIGS. 1 and 2, product dispensing head assembly 21 is securely affixed to storage container/vessel 22 to prevent unwanted removal of product dispensing head assembly 21 from storage container/vessel 22. In this way, the flowable material retained within storage container/vessel 22 is incapable of being accessed or distributed into any container, other than authorized containers.

Similarly, receiving coupling/adaptor 23 is preferably securely affixed to a suitable dilution container 24 which is specifically designed for receiving the flowable material and enabling the flowable material to be diluted for use. Such containers typically comprise large tanks employed in the industry for receiving chemicals and enabling the chemicals to be diluted. Preferably, such tanks would be constructed or retrofitted to incorporate receiving coupling/adaptor 23 securely affixed thereto, enabling dilution container 24 to receive and activate product dispensing head assembly 21 in order to receive the flowable materials securely retained therein.

When dilution container 24 has received the desired quantity of the flowable material and storage container/vessel is removed from adaptor 23, cover 26 is secured to adaptor 23 in order to close and seal adaptor 23. Although cover 26 is optional, it is preferred that cover 24 be secured to adaptor 23 or container 24 by suitable tethering means in order to enable cover 26 to be easily used and retained in position when not in use.

Figure 3:
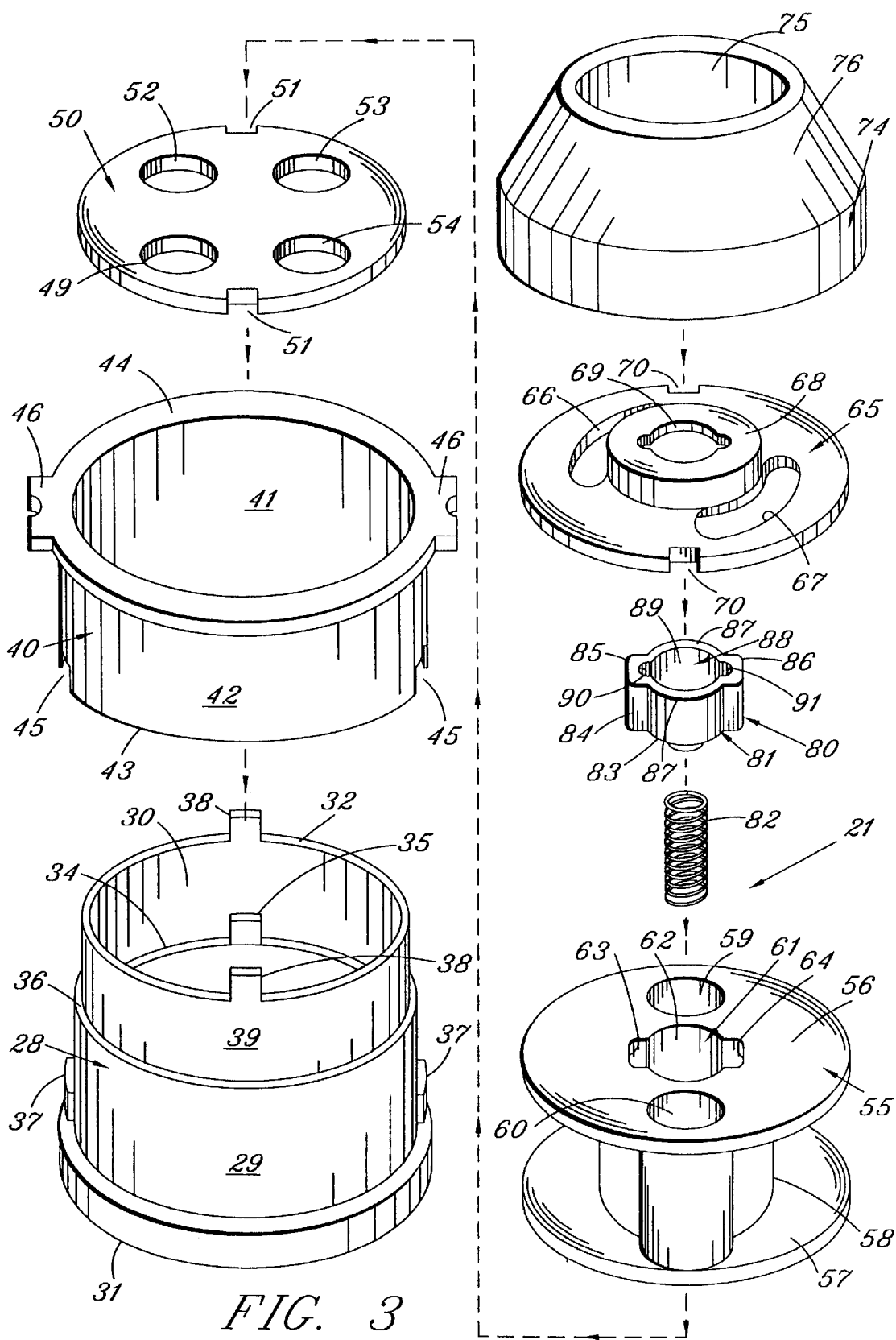
FIG. 3 is an exploded perspective view of the product dispensing head assembly of the present invention with each of the components forming the product dispensing head assembly depicted in their entirety.

In FIG. 3, each of the components forming product dispensing head assembly 21 of the present invention are fully depicted. As will be evident from this disclosure, a plurality of alternate constructions can be employed without departing from the scope of the present invention. However, for illustrative purposes, the preferred construction is depicted in FIG. 3 and fully detailed below.

The first component forming product dispensing head assembly 21 is base 28 which preferably comprises an elongated, open-ended cylindrical construction having an outer surface 29 and an inner surface 30. The overall length of base 28 is defined by a lower, container engaging edge 31 and an opposed upper edge 32. In the preferred embodiment, base 28 and lower edge 31 are constructed for being securely affixed to storage container/vessel 22 in a manner which prevents unauthorized removal of product dispensing head assembly 21 from storage container/vessel 22. In this way, unwanted access to the flowable material contained within storage container/vessel 22 is prevented. In order to attain the secure, locked, interengagement of product dispensing head assembly 21 with storage container/vessel 22, any desired well-known affixation system can be employed, including the use of mechanical or chemical fastening means.

In this preferred construction, base 28 incorporates a substantially circular shaped, inwardly extending ledge 34 mounted to inside wall surface 30. In addition, a pair of posts 35 are positioned on inside wall 30 of base 28 diametrically opposed from each other in cooperating relationship with ledge 34. As detailed below, post 35 and ledge 34 are employed for securely locking a cooperating component in the precisely desired position.

In the construction depicted in FIG. 3, outside wall/surface 29 comprises a circular shaped, outwardly extending ledge 36, peripherally surrounding wall/surface 29. In addition, a pair of posts 37 are also formed on surface 29 in spaced relationship with edge 31. As is fully detailed below, posts 37 are employed to securely retain a cooperating component of product dispensing head assembly 21 in a precisely desired position.

Base 28 comprises two additional post members 38 extending upwardly from edge 32. Posts 38 are dimensioned for cooperative inter-engagement with a cooperating component to securely position and retain the cooperating component in the precisely desired location. This cooperative interconnection is fully detailed below.

Finally, base 28 comprises an upper, outside wall surface 39 which preferably comprises thread means integrally formed therein. As detailed below, threaded wall surface 39 is employed for secure engagement with a further cooperating member.

The next component employed in forming product dispensing head assembly 21 is cylindrically shaped collar 40. In its preferred construction, collar 40 comprises an open-ended, cylindrical shape, defined by inside surface 41, outside surface 42, lower edge 43 and upper, flange-bearing edge 44. In addition, a pair of radially extending tabs 46, 46 are formed on flange bearing edge 44, extending outwardly therefrom. As detailed below, tabs 46, 46 are employed for engaging and holding product dispensing head assembly 21 with receiving coupling/adaptor 23 as well as providing secure engagement with position defining detent means formed in coupling/adaptor 23.

Furthermore, a pair of slots or notches 45 are formed, diametrically opposed from each other in lower edge 43 of collar 40. Notches 45 are dimensioned for sliding interengagement with posts 37 of base 28. In addition, the diameter of inside surface 41 of collar 40 is formed slightly greater than the outside diameter of outside surface 29 of base 28. In this way, collar 40 is capable of telescopic interengagement with base 28, peripherally surrounding and enclosing outside surface 29 thereof, with slots 45, 45 engaged with posts 37, 37 of base 28. In this way, axial and rotational movement of collar 40 relative to base 28 is controlled by the position of flange 36, thereby assuring tabs 46, 46 are in the precisely desired location.

By employing this construction, collar 40 is quickly and easily mounted in secure peripherally surrounding engagement with base 28, in a secure, non-rotatable mounted engagement therewith. By forming the axial length of collar 40 with a precisely desired dimension, flange bearing edge 44 with radially extending tabs 46, 46 are positioned in a precisely desired location relative to base 28.

If desired, a variety of alternate constructions can be employed for achieving the construction detailed above relative to base 28 and collar 40. However, for manufacturing purposes, the use of these independent components is preferred. However, such alternate variations which achieve substantially similar results are intended to be within the scope of this invention.

The next component incorporated into product dispensing head assembly 21 of the present invention is upper port plate 50. In the preferred configuration, upper port plate 50 comprises a circular shaped, substantially flat disc member comprising an outer diameter slightly less than the diameter of inside wall 30 of base 28. In the preferred construction, upper port plate 50 is dimensioned for sliding interengagement with inside wall 30 of base 28 to be securely mounted therein, while preventing unwanted passage of any flowable material between the terminating edge of upper port plate 50 and wall 30.

In order to assure that upper port plate 50 is maintained in the precisely desired position, radially extending flange 34 of base 28 is formed at the precise location for cooperatively engaging and securely maintaining upper port plate 50 in the precise axial location desired. In addition, upper port plate 50 incorporates diametrically opposed slots 51 formed in the outer edge thereof which are dimensioned for cooperative interengagement with post 35 of base 28. In this way, upper port plate 50 is positioned and maintained in the precisely desired location with base 28, while also being securely maintained in a non-rotatable secure engagement therewith.

In the preferred embodiment, upper port plate 50 incorporates a plurality of holes or passageways 52, 53, 54, and 49 formed therein, with each comprising substantially equal diameters. In the preferred construction, holes 52 and 53 are formed in plate 50 in substantially circular shapes with the centers thereof arcuately spaced apart an arcuate distance off about 72°. Preferably, holes 54 and 49 are formed in substantially circular shapes, with holes 52, 53, 54 and 49 all comprising substantially equal diameters. Furthermore, hole 54 is formed in plate 50 diametrically opposed from hole 52, while hole 49 is formed in plate 50 diametrically opposed from hole 53. As a result, holes 49 and 54 also have their center points spaced apart an arcuate distance of about 72°.

By employing this construction, the centers of holes 53 and 54 are arcuately spaced apart a distance of about 108°, while the centers of holes 52 and 49 are also spaced apart an arcuate distance of about 108°. As detailed below, this construction and arcuate positioning of holes 52, 53, 54, and 49 assist in controlling the transfer of the flowable material from storage container/vessel 22 to dilution container 24.

A further component incorporated into the preferred construction of product dispensing head assembly 21 is measuring chamber 55. In this embodiment, measuring chamber 55 comprises a generally cylindrical construction having an outer diameter slightly less than the inside diameter of wall 30 of base 28. In this way, measuring chamber 55 is capable of telescopic, axial retained engagement within base 28 with the circular shaped outer edges thereof constructed for sliding, rotational engagement with wall 30 of base 28. In addition, measuring chamber 55 is constructed for being telescopically inserted into base 28 in direct contact with upper port plate 50, enabling measuring chamber 55 to rotate about its central axis relative to chamber 28 and upper port plate 50.

In the preferred construction, measuring chamber 55 comprises two juxtaposed, spaced, circular shaped panels 56 and 57 both of which are positioned in juxtaposed, spaced cooperating relationship with each other. In addition, panels 56 and 57 each comprise substantially equivalent diameters which enable measuring chamber 55 to be telescopically inserted into base 28 and rotationally movable relative thereto.

In addition, measuring chamber 55 also incorporates a housing portion 58 extending between panels 56 and 57 and maintaining panels 56 and 57 at the precisely desired spaced distance. Housing 58 incorporates two elongated passageways 59 and 60, both of which are preferably formed through panels 56 and 57 and comprise substantially elongated, open ended cylindrical shapes.

In the preferred construction, passageways 59 and 60 comprise diameters substantially equal to the diameters of holes 52, 53, 54, and 49 of plate 50. Although preferred, this construction is not required. However, in order to employ the construction detailed above for plate 50, the diameter of passageways 59 and 60 must be able to fit between holes 52 and 53 and holes 49 and 54 without overlapping. In this way, the desired controlled dispensing of the flowable material is attained.

By employing this construction, open ended, cylindrically shaped passageways 59 and 60 establish two separate and independent zones within which the flowable material contained within storage container/vessel 22 can be accumulated for subsequent dispensing. By forming passageways 59 and 60 with a specific, desired dimension, the precise volume of passageways 59 and 60 is established, enabling the amount of flowable material retained therein to be precisely measured and dispensed in specific, predetermined measured quantities.

The construction of measuring chamber 55 is completed by the incorporation of an elongated, centrally disposed keyway slot 61 formed in panel 56 and extending axially therefrom into housing 58. In the preferred construction, elongated, centrally disposed keyway slot 61 is opened only through panel 56, while closed at its opposed end, and is centrally disposed, with passageways 59 and 60 positioned equidistant therebetween.

The next component incorporated into product dispensing head assembly 21 is lower port plate 65, which is constructed for mounted, locked engagement with base 28. In its preferred construction, lower port plate 65 is circular shaped and incorporates two elongated, arcuately shaped slots 66 and 67, which are positioned in cooperating relationship with each other. In the preferred construction, arcuate slots 66 and 67 each comprise a width substantially equal to the diameter of passageway 59 or 60, and an arcuate length equal to at least twice the arcuate diameter of passageway 59 or 60.

Lower port plate 65 also preferably incorporates a centrally disposed, upstanding boss 68 positioned between slots 66 and 67, with a keyway shaped portal slot 69 formed in the top surface of boss 68. In addition, as more fully detailed below, boss 68 also incorporates a lock member receiving zone 71, best seen in FIGS. 7 and 9.

The construction of plate 65 is completed by forming a pair of notches 70, 70 in the outer peripheral surface of plate 65, diametrically opposed from each other. In the preferred construction, notches 70, 70 are dimensioned for cooperative interengagement with upstanding posts 38, 38 formed on upper edge 32 of base 28.

In addition, the diameter of support plate 65 is preferably substantially equivalent to the diameter of upper portion 39 of base 28. In this way, support plate 65 is securely mounted to base 28, retained in non-rotating engagement therewith, with the outer peripheral portion of plate 65 in secure contacting engagement with edge 32, with notches 70, 70 engaged with posts 38, 38.

A still further component of product dispensing head assembly 21 is cover 74 which is constructed for mounted engagement with base 28, peripherally surrounding and threadedly engaging upper portion 39 of base 28, in secure, contacting engagement with collar 40 and flange 44. In its preferred construction, cover 74 comprises a generally open-ended, cylindrically shaped inner wall 75 comprising thread means in the lower portion thereof, and an outer wall 76, a portion of which is formed in a truncated conical shape. Although any desired shape can be employed, a truncated conical shape is preferred for easy, nested engagement with receiving adaptor/coupling 23. Furthermore, inside surface 75 is preferably constructed for peripheral surrounding engagement with base 28 and lower port plate 65 in a manner which assures that no leakage of the flowable material can occur.

Finally, lock means 80 is employed to assure that the desired locking engagement and controlled, measured dispensing is achieved by product dispensing head assembly 21. In the preferred construction, lock means 80 comprises a keyway-shaped lock member 81 and spring means 82, both of which are mounted within elongated keyway 61 of measuring chamber 55. As depicted, keyway 61 comprises a unique shape, preferably formed as a centrally disposed cylindrical bore 62 with a pair of radially extending rectangular shaped zones 63, 64 diametrically extending therefrom. Although alternate shapes can be employed, this shape has been found to provide the desired results.

In addition, lock member 81 is constructed with a size and shape which conforms to the shape of keyway 61. In the preferred construction, lock member 81 comprises a base 83 and an upstanding wall 84 extending from base 83. Wall 84 is formed comprising rectangular-shaped zones 85 and 86 and centrally disposed curved zones 87.

In this construction, rectangular zone 85 of wall 84 of lock member 81 is constructed for nested longitudinally movable engagement within rectangular zone 63 of keyway 61. Similarly, curved zones 87 of wall 84 of lock member 81 is constructed for nested longitudinal movement in cylindrical bore 62 of keyway 61, while rectangular zone 86 of wall 84 of lock member 81 is constructed for nested, longitudinal movement in rectangular zone 64 of keyway 61.

By employing this construction, upstanding wall 84 of lock member 81 defines a key-receiving cavity 88, having a unique shape comprising a central, substantially circular shaped bore 89 and two radially extending, diametrically opposed side channels 90, 91. In this way, movement of lock member 81 is attained only by employing a key member having a shape consistent with the shape of cavity 88.

In the preferred construction, one end of spring means 82 is mounted to the closed end of keyway 61, with the opposed end engaging base 83 of keyway-shaped lock member 81. In this way, lock member 81 is longitudinally movable within keyway 61, continuously biased upwardly toward boss 68, into engagement within lock member receiving zone 71 formed in boss 68. In addition, by forming portal 69 off boss 68 with dimensions substantially equivalent to cavity 88, lock member 81 is maintained in captured biased engagement within zone 71 of boss 68 of lower port plate 65, requiring an external, longitudinal force to move lock member 81 out of engagement with zone 71 of boss 68 and into axial engagement within keyway 61.

By employing the components detailed above, product dispensing head assembly 21 of the present invention is capable of being maintained in a securely locked position, wherein activation for dispensing of the contents of storage container/vessel 22 is prevented until the specially designed key member is employed. In the preferred construction, the key member is formed on receiving coupling/adaptor 23, enabling the engagement of product dispensing head assembly 21 with coupling/adaptor 23 to allow precisely measured quantities of the flowable material contained in storage container/vessel 22 to be accurately dispensed from storage container 22 into dilution container 24. In this way, the desired, precise, controlled, measured dispensing capabilities of product dispensing head assembly 21 are achieved.

In order to attain the desired, measured, controlled dispensing of the flowable material from storage container/vessel 22, as well as prevent access to storage container/vessel 22 by unauthorized individuals, measuring chamber 55 is constructed for being rotationally movable within base 28, while hole-bearing upper port plate 50 and arcuate slot bearing lower port plate 65 are fixedly mounted to base 28. With measuring chamber 55 sandwiched between upper port plate 50 and lower port plate 65, the rotational movement of chamber 55 is controllably attained by the positioning of lock member 81 in keyway 61, with curved zones 87 and rectangular zones 85 and 86 of lock member 81 engaged respectively within cylindrical bore 62 and rectangular zones 63 and 64 of keyway 61. Once in these positions, with the key member engaged in key receiving cavity 88 of lock member 81, controlled rotational movement of lock member 81 and measuring chamber 55 is easily attained.

The rotational movement of measuring chamber 55 causes open-ended, elongated passageways 59 and 60 to be selectively aligned with holes 52, 53, 54 and 49 of upper port 50 and arcuate slots 66 and 67 of plate 65. As is fully detailed below, by selectively positioning elongated passageways 59 and 60 in precisely desired locations relative to holes 52, 53, 54 and 49, as well as arcuate slots 66 and 67, the precisely desired, controlled, measured dispensing of the flowable material is achieved.

In order to assure that measuring chamber 55 is rotationally movable only when desired, lock means 80 are employed. In this regard, upstanding boss 68 of lower port plate 65 incorporates a lock member receiving zone 71 formed therein, with zone 71 constructed with a size and shape dimensioned for receiving and retaining keyway-shaped lock member 81 therein, in abutting contact with portal 69. However, receiving zone 71 is constructed to prevent keyway-shaped lock member 81 from passing completely therethrough, with the only access to keyway-shaped lock member 81 being through keyway-shaped portal 69 formed on the top surface of upstanding boss 68, whereby entry into cavity 88 is attained.

As is more fully detailed below, lock member 81 is normally maintained in spring-biased engagement in receiving zone 71 of boss 68 of plate 65, extending from this engaged position to engagement with keyway 61 of measuring chamber 55. When in this position, lock member 81 effectively blocks rotation of measuring chamber 55, by interlocking measuring chamber 55 to lower port plate 65. When lock member 81 has been axially displaced from retained engagement with receiving zone 71 of boss 68 of plate 65 and the entire length of lock member 81 is retained in elongated passageway 61 of measuring chamber 55, locked interconnection is disengaged and measuring chamber 55 is able to be rotated.

Figure 4:
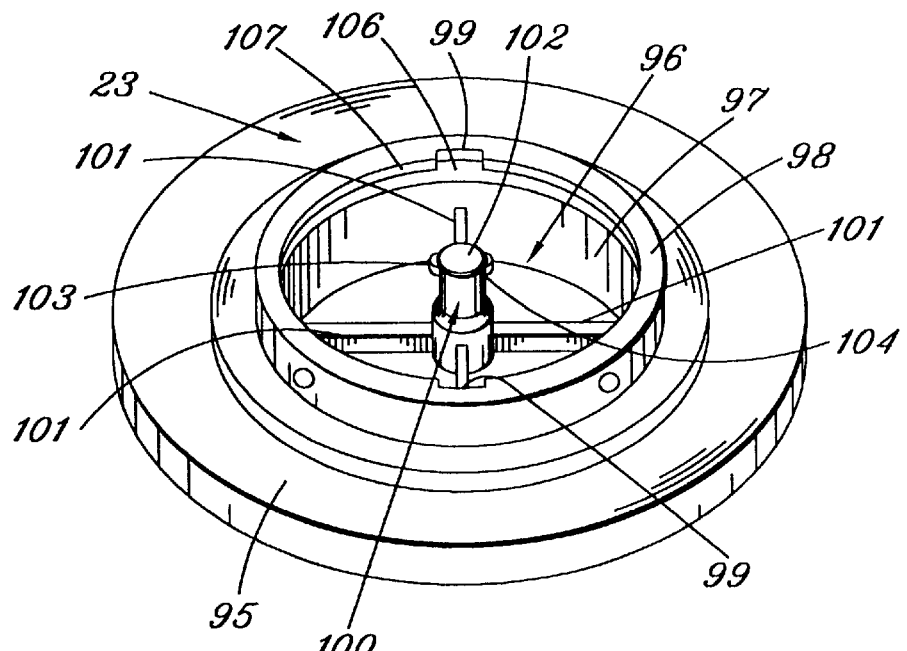
FIG. 4 is a perspective view of a receiving coupling or adaptor constructed for being mountable to a dilution tank or container and for cooperating with the product dispensing head assembly of the present invention.
Figure 5:
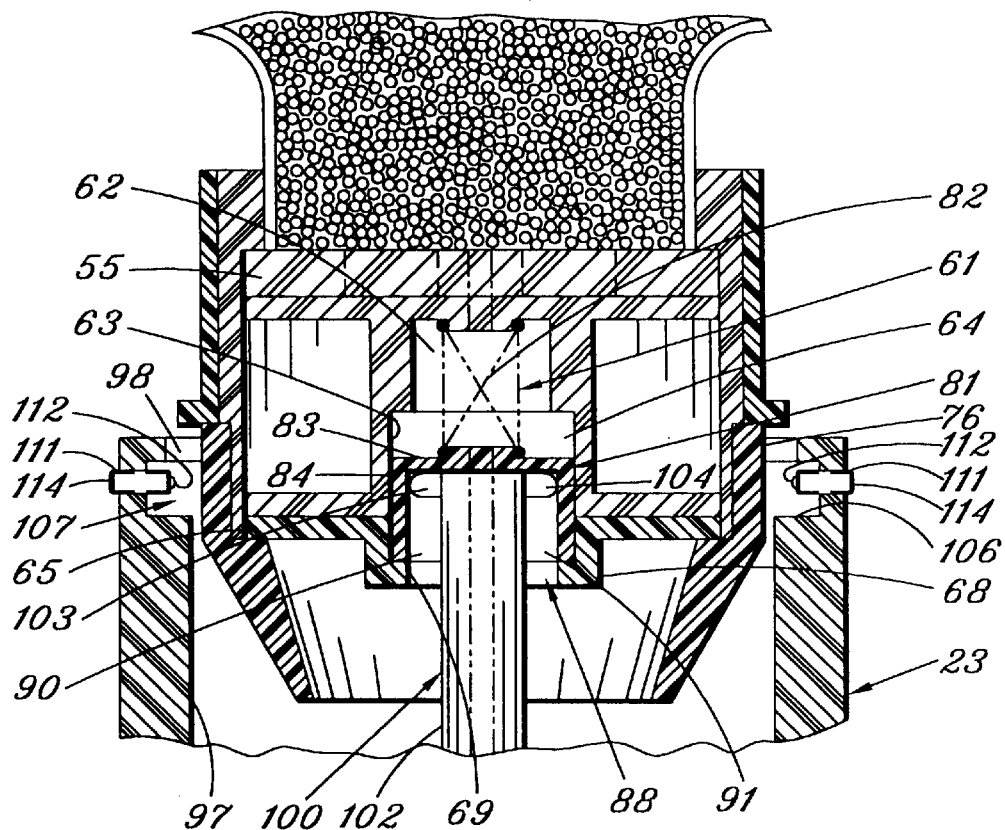
FIG. 5 is a cross-sectional side elevation view, partially broken away, of the dispensing system of the present invention with the head assembly and coupling/adaptor almost fully engaged and depicted with a pivotable closure plate associated with the coupling/adaptor.

In order to provide the controlled release of lock member 81 from engagement with receiving zone 71 of boss 68 of lower port plate 65 and enable measuring chamber 55 to be controllably rotated relative to lower port plate 65 and upper port plate 50, receiving coupling/adaptor 23 is preferably employed. As best seen in FIGS. 4 and 5, receiving coupling/adaptor 23 incorporates a supporting flange 95 constructed in any desired configuration, to securely affix receiving coupling/adaptor 23 to any desired dilution container 24.

In the preferred embodiment, receiving coupling/adaptor 23 comprises a cylindrically shaped enlarged portal zone 96 which is constructed for receiving cover 74 of product dispensing head assembly 21. As discussed above, cover 74 incorporates outer wall 76, a portion of which is formed with a truncated conical shape. This truncated conical shape portion is employed for assuring quick and easy positioning of product dispensing head assembly 21 with receiving coupling/adaptor 23 and providing guided, self-centering, locked interengagement between product dispensing head assembly 21 and receiving coupling/adaptor 23.

Portal zone 96 is defined by a substantially circular shaped wall 97 having an inside diameter substantially equivalent to or slightly greater than the outer diameter of outer wall 76 of cover 74. In this way, secure, nested interengagement of these two components is provided. Furthermore, in order to assure secure locked interengagement between product dispensing head assembly 21 and receiving coupling/adaptor 23, coupling/adaptor 23 incorporates flange 98 radially extending inwardly from the top edge of wall 97 in juxtaposed, spaced cooperation with stop surface or ledge 107 formed in wall 97 and defining annular ring zone 107 therebetween.

In addition, flange 98 incorporates a pair of diametrically opposed notches 99 formed therein. In this way, as further detailed below, radially extending tabs 46, 46 of flange 44 are mountable in secure engagement with coupling/adaptor 23 in a manner which enables engagement in one orientation and, when rotated away from this position, securely locks the components together.

Notches 99 are dimensioned for receiving radially extending tabs 46 of flange 44 of collar 40. By providing notches 99 and flange 98 for cooperative receiving and locked interengagement with extending tabs 46 of collar 40, the precise positioning and secure retention of product dispensing head assembly 21 with receiving coupling/adaptor 23 is assured. Once tabs 46,46 pass through notches 99, 99, tabs 46, 46 enter annular ring zone 107 and, when head assembly 21 is rotated relative to coupling/adaptor 23, tabs 46, 46 are locked within ring zone 107, preventing axial movement of head assembly 21 from coupling/adaptor 23.

In the preferred embodiment, a plurality of position locator means 114 are mounted in coupling/adaptor 23 in cooperating relationship with annular ring zone 107. In the preferred embodiment, as depicted in FIG. 5, coupling/adaptor 23 incorporates a plurality of threaded holes radially extending from annular ring zone 107. In each of said radial holes, position locator means 114 is threadedly mounted.

In the preferred construction, position locator means 114 comprises a threaded plug 111, a captured ball 112, and spring means 113 (not shown) mounted for biasing ball 112 outwardly towards the terminating end of plug 111.

By mounting position locator means 114 in cooperation with annular ring zone 107, each of the alternate cooperating positions in which dispensing head assembly 21 is capable of being placed relative to coupling/adaptor 23, as detailed below, are easily identified by the user. By employing position locator means 114, the arcuate movement of radially extending tabs 46/46 in ring zone 107 causes ball 112 of position locator means 114 to be moved radially inwardly as tabs 46/46 passes over ball 112. Then, when notch 109 of each radially extending tab 46 is aligned with ball 112, ball 112 will automatically move outwardly into engagement therewith, providing a positive indicator to the user that a desired position has been reached. In order to further assist in the rotational movement of dispensing head assembly 21 relative to coupling/adapter 23 and the free movability of radially extending tabs 46, 46 relative to annular ring zone 107 and position locator means 114, tabs 46, 46 preferably incorporate ramped, sloping edges, which allows the movement thereof into and out of engagement with axially movable ball 112 to be more easily achieved.

In order to provide authorized unlocking of product dispensing head assembly 21 and controlled rotational movement of measuring chamber 55 relative to base 28, receiving coupling/adaptor 23 incorporates an elongated, upstanding, key-forming post 100. Post 100 is preferably positioned in the center of portal zone 96, supported and maintained in this position by support rods 101, which radially extend from post 100 to wall 97.

Key forming post 100 of receiving coupling/adaptor 23 comprises the movement controlling key member detailed above in relationship to keyway shape lock member 81. In order to attain a construction which enables key forming post 100 to be received within key receiving cavity 88 of lock member 81 and enable lock member 81 to be rotationally movable, in controlling interengagement with measuring chamber 55, key forming post 100 preferably comprises a cylindrical shaped central column 102 and radially extending, diametrically opposed bosses 103 and 104, positioned at the distal end of column 102.

By employing this construction, the placement of product dispensing head assembly 21 in telescopic interengagement with receiving coupling/adaptor 23 causes key forming post 100 of coupling/adaptor 23 to enter keyway shaped portal 69 of lower port plate 65 and key receiving cavity 88 of lock member 81. When product dispensing head assembly 21 is in the position depicted in FIG. 5, almost completely telescopically engaged with receiving coupling/adaptor 23, lock member 81 is maintained by spring means 82 in biased engagement within receiving zone 71 of upstanding boss 68 of lower port plate 65. As discussed above, when lock member 81 is biased into engagement with receiving zone 71 of boss 68 of lower port plate 65, product dispensing head assembly 21 is completely locked and incapable of rotational movement, since lock member 81 is partially engaged in keyway 61, while also being partially engaged with immovable zone 71 of boss 68 of lower port plate 65.

In addition, key forming post 100 is dimensioned for insertion through keyway shaped portal 69 of upstanding boss 68 as well as for nested engagement with key receiving cavity 88 of lock member 81. When key forming post 100 is fully inserted in key receiving cavity 88 of lock member 81, cylindrical column 102 is fully inserted within circular bore 89 of lock member 81, with radially extending boss 103 fully engaged within side channel 90 while radially extending boss 104 of key forming post 100 is engaged within side channel 91 of lock member 81. By employing this preferred construction, complete controlled rotational movement of lock member 81 by key forming post 100 is attained, once lock member 81 has been disengaged from locked engagement with receiving zone 71 of boss 68 of lower port plate 65.

Figure 6:
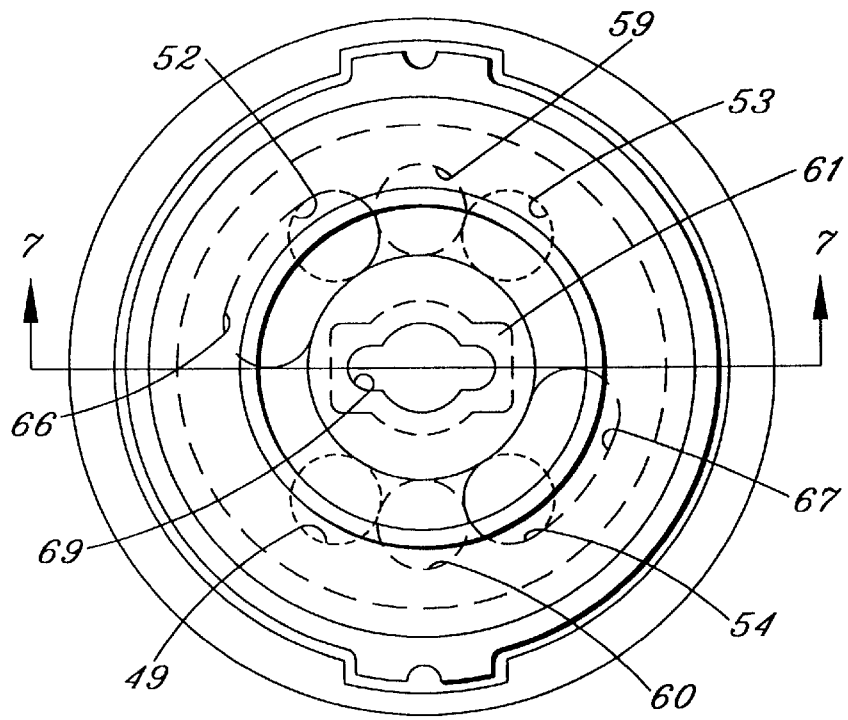
FIG. 6 is a top plan view of the dispensing system of the present invention.
Figure 7:
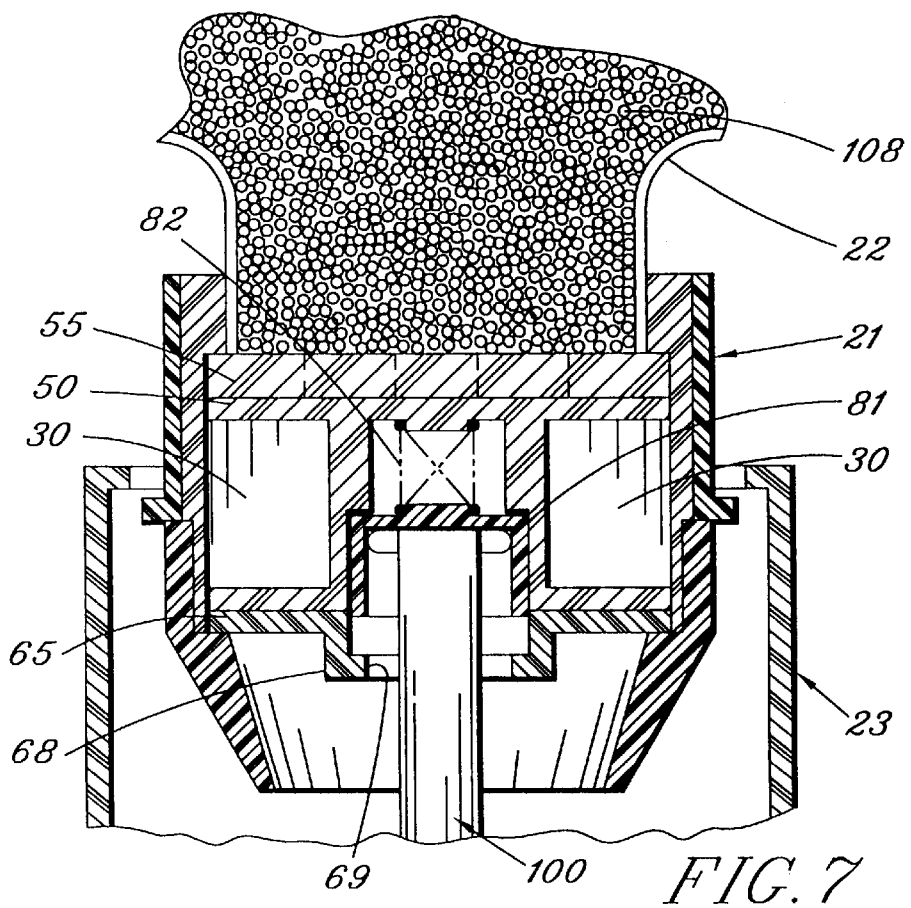
FIG. 7 is a cross-sectional side elevation view of the dispensing head system of the present invention taken along line 7—7 of FIG. 6.

In order to disengage lock member 81 from zone 71 of lower port plate 65, product dispensing head assembly 21 is completely telescopically engaged with receiving coupling/adaptor 23, so that radially extending tabs 46 of collar 40 enter cooperating slots 99 of flange 98 and are engaged therewith, as depicted in FIGS. 6 and 7. In order to attain this position, key forming post 100 forces lock member 81 to be moved axially into keyway 61 of measuring chamber 55 by applying a force to overcome spring means 82. When lock member 81 is fully engaged in keyway 61 of measuring chamber 55, product dispensing head assembly 21 is capable of being rotated relative to receiving coupling/adaptor 23 in order to activate the desired controlled dispensing of the flowable material from storage container/vessel 22.

With radially extending tabs 46 captured by flange 98 of receiving coupling/adaptor 23, the force of spring means 82 is continuously counteracted with lock member 81 retained within keyway 61 of measuring chamber 55. As a result, rotational movement of measuring chamber 55 relative to lower port plate 65 and upper port plate 50 is easily attained.

In FIGS. 6 and 7, the fully mounted, interconnected engagement of product dispensing head assembly 21 with receiving coupling/adaptor 23 is depicted. Although FIG. 7 is similar to FIG. 5, FIG. 7 depicts the full engagement of these components, wherein lock member 81 is fully engaged within keyway 61 of measuring chamber 55. When in this position, lock member 81 is fully removed from engagement with zone 71 of upstanding boss 68 of lower port plate 65 and is capable of controlled, rotational movement of measuring chamber 55.

As discussed above, when measuring chamber 55 is in its normal position, relative to lower port plate 65 and upper port plate 50, flowable material 108 contained within storage container/vessel 22 is incapable of being dispensed through product dispensing head assembly 21. The secure retention of flowable material 108 in storage container/vessel 22 is assured due to the positioning and alignment of the various apertures formed in upper port plate 50, lower port plate 65, and measuring chamber 55. These relative positions are clearly shown in FIG. 6. Furthermore, by referring to FIG. 16, along with the following detailed disclosure, the cooperating relationship of movable passageway 59 and 60 of measuring chamber 55 with the holes of upper port plate 50 and the slots of lower port plate 65 can best be understood.

Figure 16:
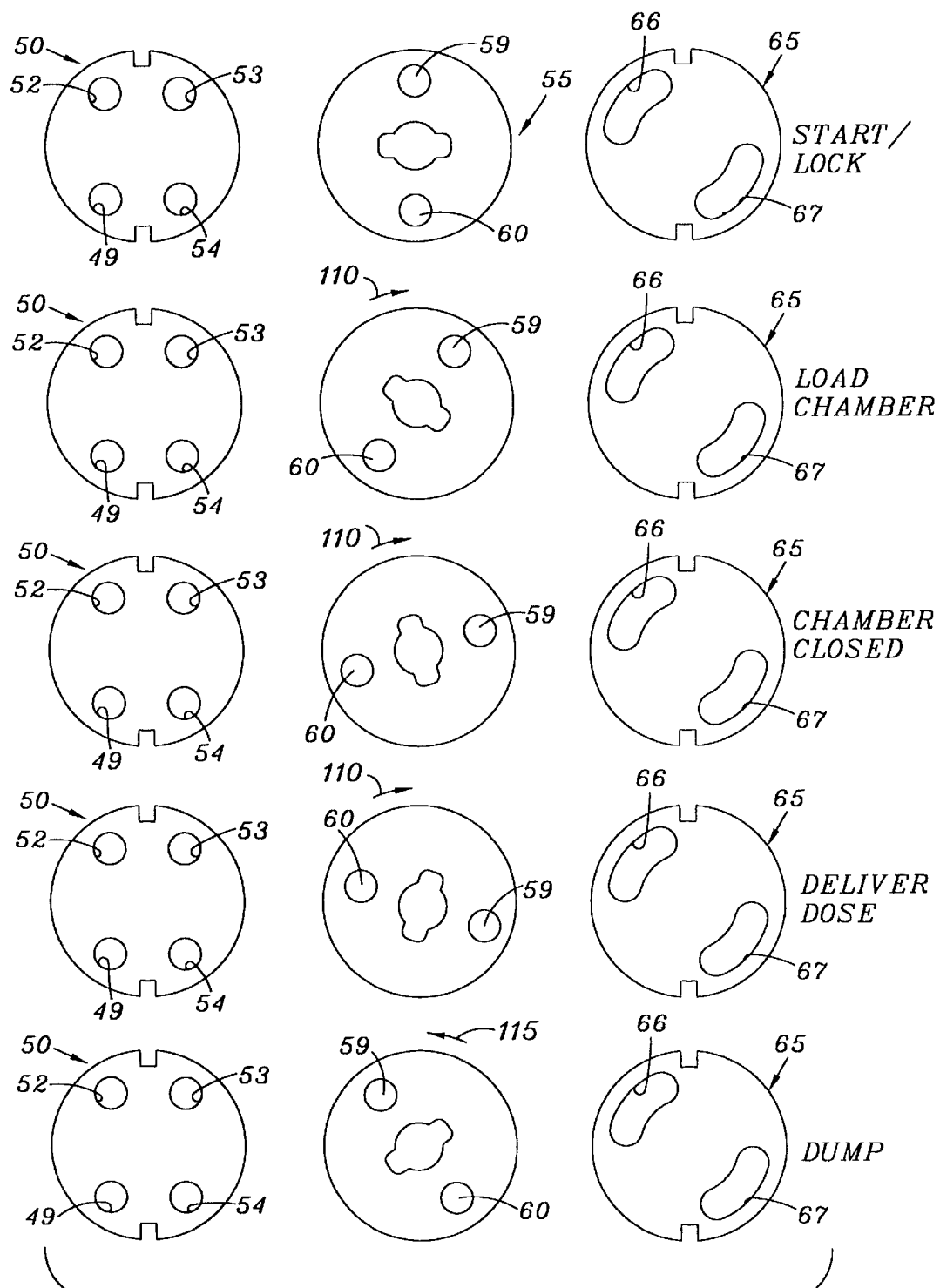
FIG. 16 is a diagrammatic top plan view of the upper port plate, measuring chamber, and lower port plate of the product dispensing head assembly in each of the alternate positions depicted in FIGS. 6–15.

By referring to FIGS. 6 and 16, it is apparent that in this normally closed position, hole 52 of upper port plate 50 is vertically aligned with a portion of arcuate slot 66 of lower port plate 65. Similarly, hole 54 of holding plate 50 is also vertically aligned with a portion of slot 67 of lower port plate 65. However, passageway 59 of measuring chamber 50 is positioned directly between hole 52 and hole 53 of upper port plate 50 while passageway 60 of measuring chamber 55 is positioned directly between hole 49 and hole 54 of upper port plate 50.

As a result, although flowable material 108 is capable of passing into holes 52, 53, 54, and 49, no further passage of flowable material 108 is possible, since the passageways 59 and 60 of measuring chamber 55 block any further movement of flowable material 108. As a result, flowable material 108 is completely sealed within storage container/vessel 22 and is incapable of being dispensed therefrom, when product dispensing head assembly 21 is in this normally closed position.

In the preferred construction, the diameters of passageways 59 and 60 are substantially equivalent to the diameter of holes 52, 53, 54, and 49. In addition, as discussed above, holes 52 and 53 are formed in upper port plate 50, with their respective center points spaced apart an arcuate distance of about 72°. Similarly, passageways 54 and 49 are formed in upper port plate 50 with their respective center points arcuately spaced apart about 72°. By employing this construction, the center points of holes 52 and 49 are arcuately spaced apart a distance of 108°, with the center points of holes 53 and 54 also arcuately spaced apart a distance of about 108°.

Furthermore, the diameters of holes 52, 53, 54, and 49 as well as the diameter passageways 59 and 60 are specifically selected to assure that passageway 59 can be positioned between holes 52 and 53 and passageway 60 can be positioned between holes 49 and 54 without any portions thereof overlapping. As a result, secure closure of storage container/vessel 22 is assured.

Finally, in constructing arcuate slots 66 and 67, as detailed above, each arcuate slot is preferably constructed with a width substantially equal to the diameter of passageways 59 or 60 and an arcuate length equal to at least twice the arcuate diameter of passageway 59 or 60. In this way, as detailed below, the controlled dispensing of flowable material 108 is provided.

Figure 8:
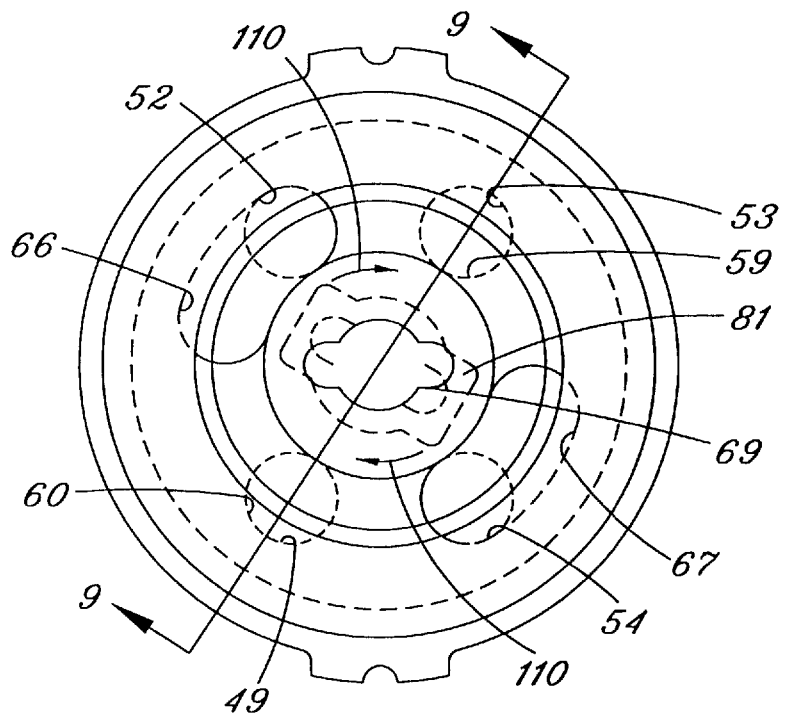
FIG. 8 is a top plan view of the product dispensing head assembly of the present invention shown in its measured dose loading position.
Figure 9:
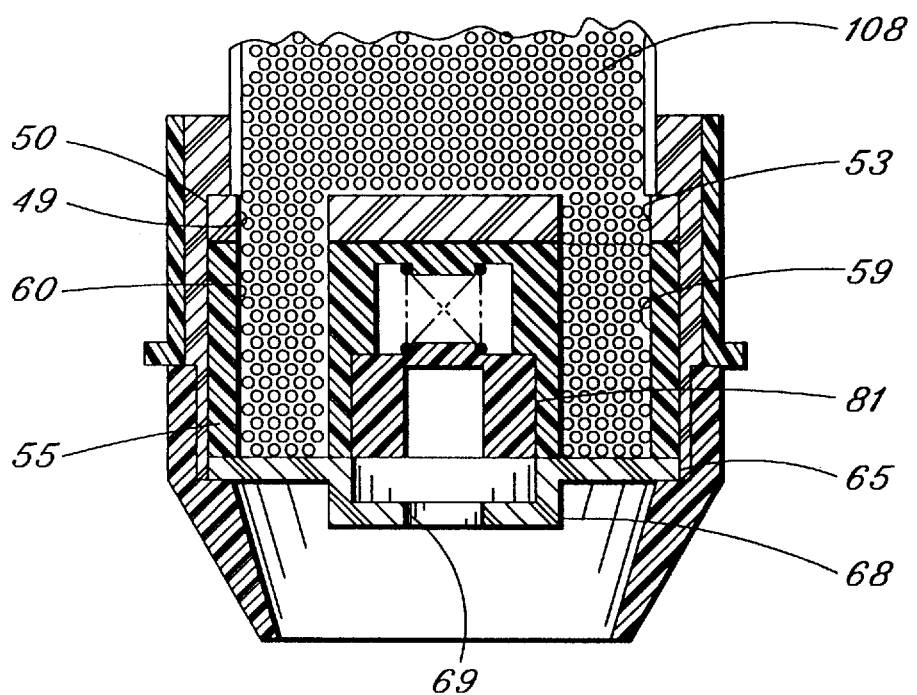
FIG. 9 is a cross-sectional side elevation view of the product dispensing head assembly of the present invention taken along line 9—9 of FIG. 8.

Once product dispensing head assembly 21 is fully engaged with receiving coupling/adaptor 23, as shown in FIGS. 6 and 7, the typical first step is to rotate measuring chamber 55 arcuately clockwise, in the direction shown by arrows 110 in FIGS. 8, 9, and 16, a distance of about 36°. As discussed above, the arcuate movement of measuring chamber 55 is easily attained due to the interengagement of key forming post 100 in cavity 88 of lock member 81 and the controlled, rotation inducing engagement of lock member 81 in keyway 61 of measuring chamber 55.

As shown in FIGS. 8 and 16, when measuring chamber 55 has been arcuately rotated in the direction of arrows 110 a distance of 36°, passageway 59 of measuring chamber 55 is coaxially aligned with hole 53 of upper port plate 50. Similarly, passageway 60 of measuring chamber 55 is brought into coaxial alignment with hole 49 of upper port plate 50. Once this position is attained, flowable material 108 is capable of quickly and easily filling passageways 59 and 60. However, since arcuate slots 66 and 67 of lower port plate 65 are not aligned with passageways 59 and 60 of measuring chamber 55, flowable material 108 is incapable of moving beyond measuring chamber 55.

Figure 10:
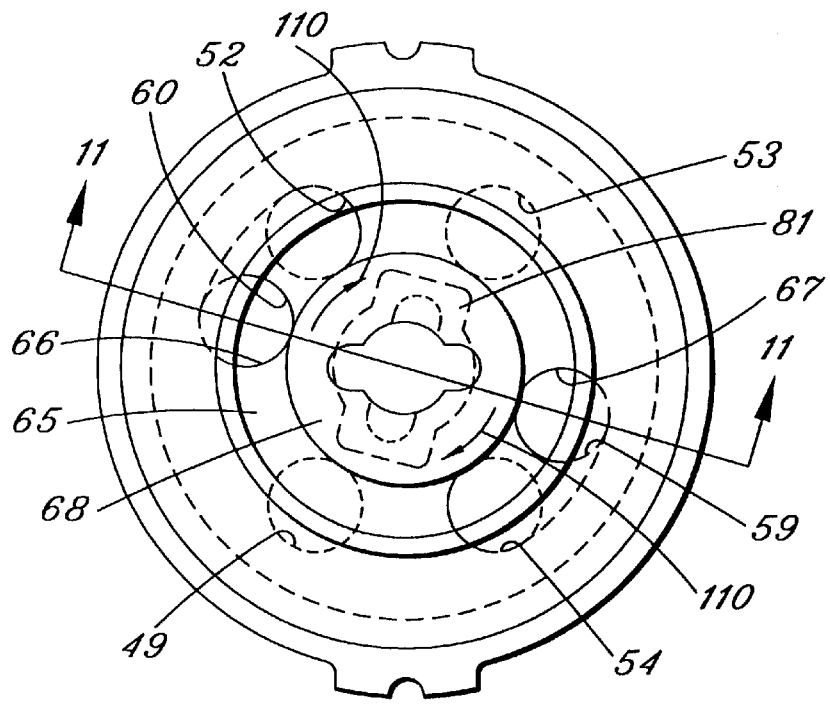
FIG. 10 is a top plan view of the product dispensing head assembly of the present invention in its measured dose dispensing position.
Figure 11:
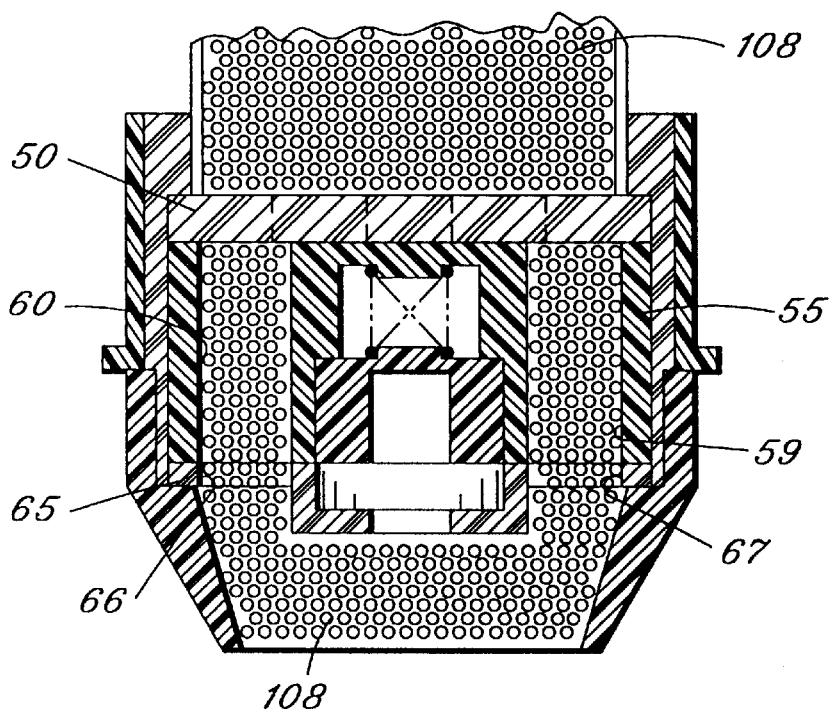
FIG. 11 is a cross-sectional side elevation view of the product dispensing head assembly of the present invention taken along line 11—11 of FIG. 10.

The next step in delivering flowable material 108 to the desired dilution container 24 is to rotate measuring chamber 55 in the direction of arrows 110 a further distance of about 72°, or a total distance of 108° from the start/lock position, to reach the position shown in FIGS. 10, 11, and 16. In this position, elongated passageway 59 of measuring chamber 55 is brought into coaxial alignment with a portion of arcuate slot 67 of lower port plate 65, while elongated passageway 60 of measuring chamber 55 is brought into coaxial alignment with a portion of arcuate slot 66 of lower port plate 65. As a result, all of the flowable material retained in passageways 59 and 60 is able to exit from passageways 59 and 60 through arcuate slots 66 and 67 into the dilution container 24 with which product dispensing head assembly 21 is cooperatively associated. In this way, the desired measured dose of flowable material 108 is delivered to dilution container 24.

As is evident from FIGS. 10, 11, and 16, as elongated passageway 59 is arcuately rotated in the direction of arrows 110, passageway 59 is removed from alignment with hole 53, while passageway 60 is removed from alignment with hole 49. As a result, once passageways 59 and 60 have been filled with flowable material 108, as detailed above in reference to FIGS. 8, 9, and 16, no further material is capable of entering passageways 59 and 60 as these passageways are arcuately moved. Furthermore, once passageways 59 and 60 have been moved out of alignment with holes 53 and 49, passageways 59 and 60 are effectively blocked from further communication with the interior of storage container/vessel 22, thereby preventing any additional flowable material 108 from entering passageways 59 and 60.

By constructing passageways 59 and 60 with a specifically desired volume, the precise quantity of flowable material 108 retained therein is pre-established. In this way, the amount of flowable material transferred from passageways 59 and 60 through arcuate slots 67 and 66, as shown in FIGS. 10, 11, and 16 is precisely controlled and constitutes a specifically desired, pre-established, measured quantity.

In normal operation, measuring chamber 55 is arcuately returned to the position depicted in FIGS. 8 and 9 in order to fill or load passageways 59 and 60 with additional flowable material 108. Then, measuring chamber 55 is rotated back to the position depicted in FIGS. 10 and 11, in order to dispense the measured quantity or dose of flowable material 108 into dilution container 24. This process is repeated until the precisely desired, measured quantity of flowable material 108 has been transferred from storage container/vessel 22 through product dispensing head assembly 21 into dilution container 24.

Figure 12:
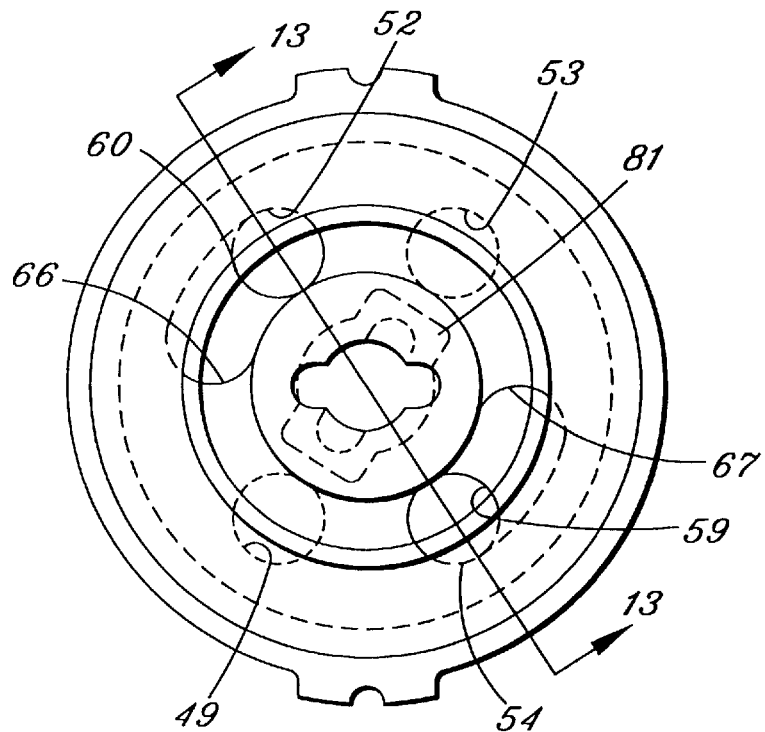
FIG. 12 is a top plan view of the product dispensing head assembly of the present invention depicted in a closed position for transferring a filled chamber.
Figure 13:
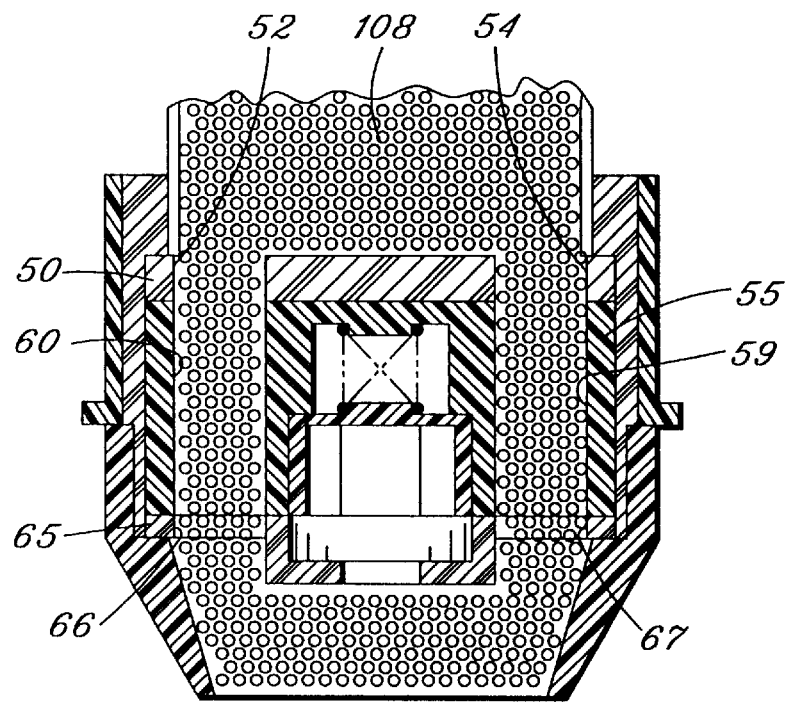
FIG. 13 is a cross-sectional side elevation view of the product dispensing head assembly of the present invention taken along line 13—13 of FIG. 12.

During the movement of chamber 55 with its associated passageways 59 and 60, between the passageway filling or loading position, depicted in FIGS. 8 and 9, and the product dispensing position depicted in FIGS. 10 and 11, chamber 55 is repeatedly rotated through the position depicted in FIGS. 12, 13 and 16. In FIGS. 12, 13 and 16, measuring chamber 55 is depicted after being rotated 36° from the position depicted in FIGS. 8 and 9, or a total of 72° from the start or lock position. In this position, passageways 59 and 60 are both filled with flowable material 108, after receiving the flowable material from the previous alignment with holes 53 and 49, while now being blocked from receiving any further flowable material from storage container/vessel 22, since passageway 59 is positioned between holes 53 and 55 of upper port plate 50, while passageway 60 is positioned between holes 52 and 49 of upper port plate 50.

Similarly, the lower end of passageways 59 and 60 are also blocked from dispensing the flowable material contained therein due to the fact that passageways 59 and 60 are not aligned with either slots 66 or 67. Consequently, when measuring chamber 55 is rotated into the position depicted in FIGS. 12 and 13, the flowable material contained within passageways 59 and 60 are securely retained therein, completely blocked from receiving any additional material as well as from dispensing the material to dilution container 24. As a result, the precisely desired quantity of flowable material 108 is transferred from the receiving position depicted in FIGS. 8 and 9 to the product dispensing position, as depicted in FIGS. 10 and 11. In this way, assurance is provided that the precisely desired total quantity of flowable material 108 can be dispensed accurately and conveniently by employing the present invention.

Once the desired quantity of flowable material 108 has been transferred to dilution container 24, product dispensing head assembly 21 is returned to its original closed position, as depicted in FIGS. 6, 7, and 16, wherein product dispensing head assembly 21 and storage container vessel 22 can be removed from engagement with receiving coupling/adaptor 23. However, as is evident from the foregoing detailed disclosure, this construction enables a precise measured amount of flowable material 108 to be carefully transferred from storage container/vessel 22 with complete assurance that only the precise amount desired is transferred. Furthermore, unwanted spillage of flowable material 108 into the surrounding area is eliminated.

Figure 14:
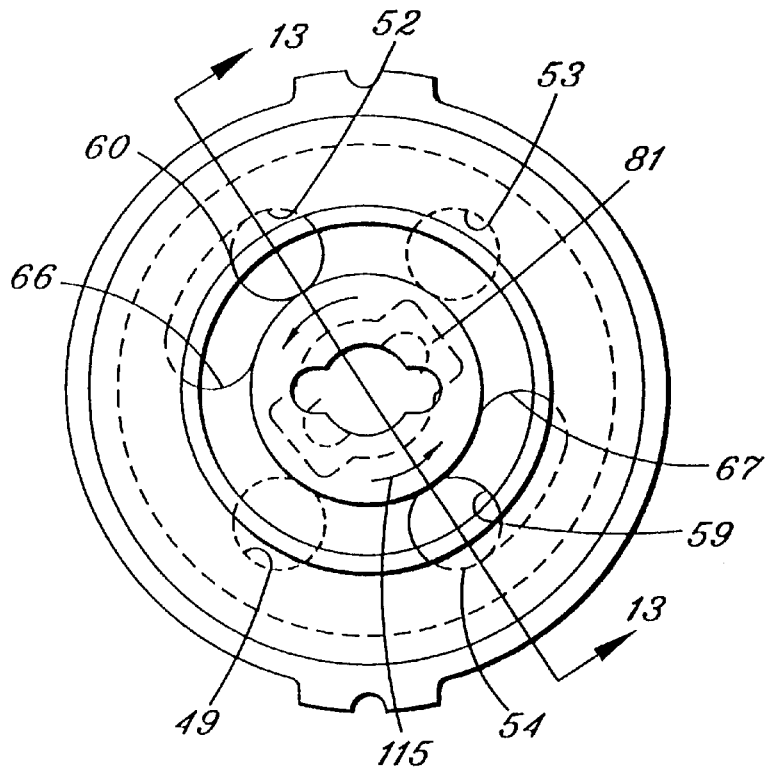
FIG. 14 is a top plan view of the product dispensing head assembly of the present invention depicted in its open position for dumping or filling of the container.
Figure 15:
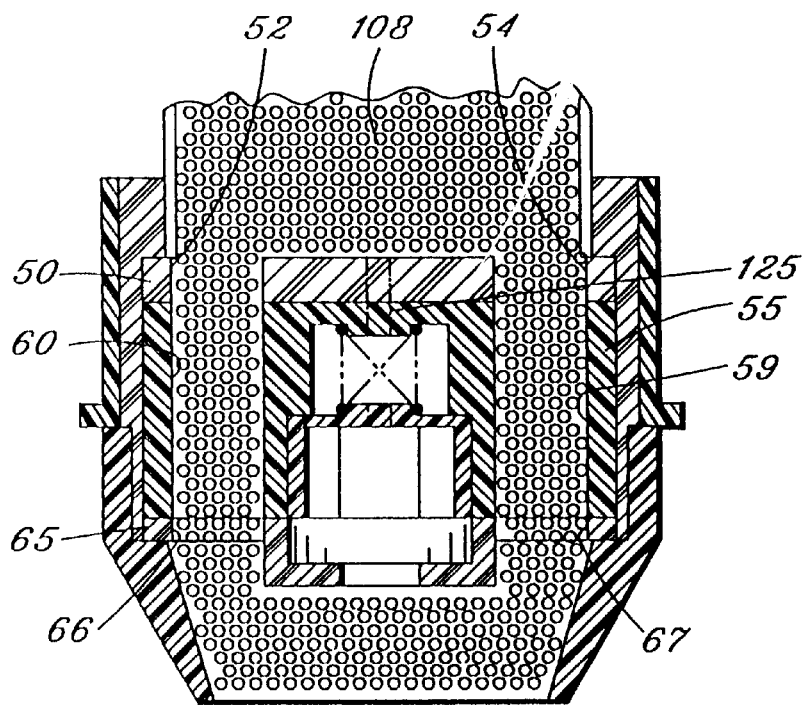
FIG. 15 is a cross-sectional side elevation view of the product dispensing head assembly of the present invention taken along line 13—13 of FIG. 12.

A further position in which the preferred embodiment of product dispensing head assembly 21 is capable of being placed is depicted in FIGS. 14, 15, and 16. To attain this position, measuring chamber 55 is arcuately rotated about 36° from its original start or lock position, depicted in FIGS. 6 and 7, in the direction shown by arrows 115. This direction is the opposite direction from arrows 110. In this position, wherein passageway 59 of measuring chamber 55 axially aligned with hole 54 of upper port plate 50 and a portion of arcuate slot 67 of lower port plate 65. Similarly, elongated passageway 60 of measuring chamber 55 is axially aligned with hole 52 of upper port plate 50 and a portion of arcuate slot 66 of lower port plate 65. When product dispensing head assembly 21 is placed in this position, all of the flowable material 108 contained within storage conitainer/vessel 22 is capable of being dispensed in its entirety into any desired receiving container.

In those instances where small measured doses of flowable material 108 is not required and the entire contents of storage container/vessel 22 is to be dispensed, the position depicted in FIGS. 14 and 15 is employed. Similarly, whenever storage container/vessel 22 has been depleted of flowable material 108, this position is employed to refill storage container/vessel 22 with the desired flowable material 108 by employing a receiving coupling/adaptor 23 as detailed above, which has been affixed to a suitable holding container within which large quantities of the desired flowable material 108 are stored. In this way, refilling of storage container/vessel 22 is quickly and easily attained and product dispensing head assembly 21 with refilled storage container/vessel 22 can be employed for providing the desired measured transfer of the flowable material to any desired dilution container 24.

Figure 17:
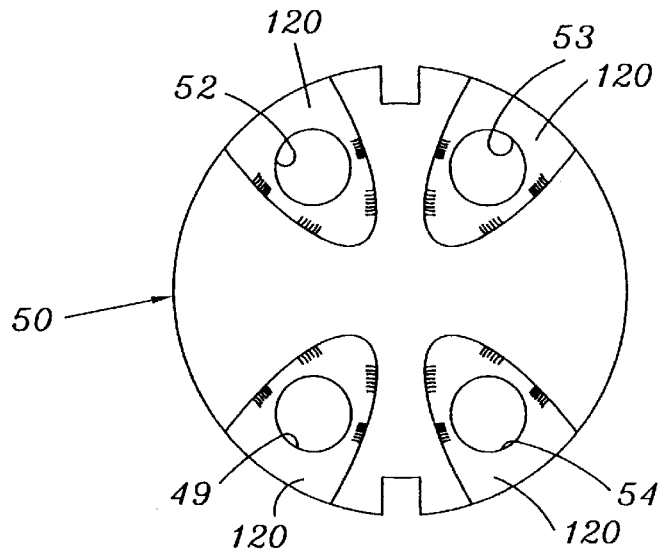
FIG. 17 is a top plan view of the preferred construction of the upper port plate of the product dispensing head assembly of the present invention.

In FIG. 17, a top plan view of the preferred construction of upper port plate 50 is provided with holes 52, 53, 54, and 49 formed therein. In this preferred embodiment, upper port plate 50 incorporates ramped, sloping, concave zones 120 formed about each hole 52, 53, 54, and 49. By positioning ramped, sloping, concave zones 120 peripherally surrounding each of the holes 52, 53, 54, and 49, assurance is provided that the flowable material is efficiently conveyed directly into holes 52, 53, 54, and 49, assuring complete dispensing of the flowable material through these holes when desired.

Figure 18:
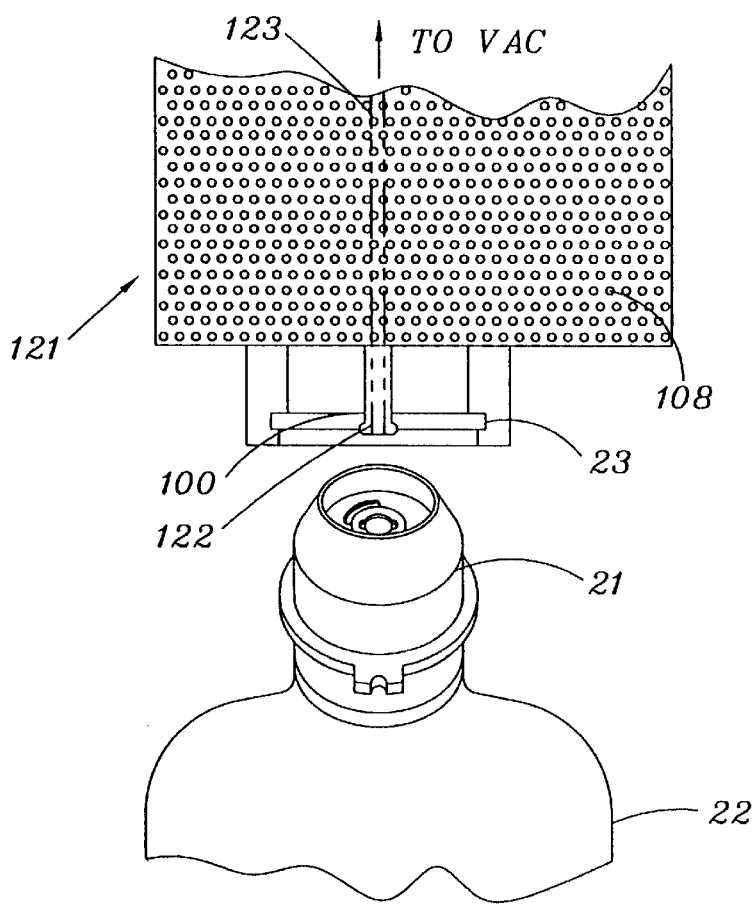
FIG. 18 is a side elevation view of a flowable material transfer station for refilling a product storage container/vessel through the product dispensing head assembly of the present invention.

As is evident from the foregoing detailed disclosure, the use of product dispensing head assembly 21 of the present invention assures that flowable material 108, which may comprise toxic chemicals, is dispensed from storage container/vessel 22 into dilution container 24 in a completely controlled, spill-free manner. However, once all of the flowable material contained within storage container/vessel 22 has been dispensed through product dispensing head assembly 21 into the desired dilution containers 24, the preferred embodiment of the present invention enables storage container/vessel 22 to be refilled in a manner which provides substantially similar controlled, spill-free transfer of the flowable material 108 into storage container/vessel 22. In order to attain this preferred, controlled, spill-free transfer of the flowable material 108 into storage container/vessel 22, a distribution system as shown in FIG. 18 is preferably employed.

Although various alternate constructions can be employed to assure spill-free, controlled, distribution of the flowable material into storage container/vessel 22, the preferred construction employs a product distribution/transfer tank 121 wherein a supply of flowable material 108 is maintained. As shown in FIG. 18, product distribution/transfer tank 121 incorporates a receiving coupling/adaptor 23 mounted at the base thereof, positioned for ease of cooperative interengagement with any desired product dispensing head assembly 21 affixed to a storage container/vessel 22.

In the preferred construction, product dispensing head assembly 21 of storage container/vessel 22 is securely mounted to receiving coupling/adaptor 23 of product distribution/transfer tank 121. This mounted interengagement is achieved in a manner substantially identical to the mounted interengagement detailed above. However, in this embodiment, product dispensing head assembly 21 is placed in mounted interengagement with receiving coupling/adaptor 23 as the lower or bottom component, as opposed to being the upper component as detailed above.

In addition, once product dispensing head assembly 21 has been mounted in secure, cooperative interengagement with receiving coupling/adaptor 23, with key forming post 100 providing the desired unlocking of lock means 80, as detailed above, product dispensing head assembly 21 is rotated relative to receiving coupling/adaptor 23 in order to achieve the fully open or dump position as discussed above in relationship with FIGS. 14 and 15. As is evident from the foregoing detailed discussion regarding this position, passageways 59 and 60 of measuring chamber 55 are aligned with apertures in both upper port plate 50 and lower port plate 65, thereby enabling flowable material 108 to pass freely from product distribution/transfer tank 121 into storage container/vessel 22. Once storage container/vessel 22 has been completely filled with the desired flowable material, product dispensing head assembly 21 is rotated relative to receiving coupling/adaptor 23, releasing storage container/vessel 22 from engagement with product distribution/transfer tank 121 and enabling the next desired container/vessel 22 to be filled in a similar manner.

In some instances, the flowable material being transferred into storage container/vessel 22 as well as dispensed by storage container/vessel 22 into dilution container 24 is formed from material which tends to release or produce a fine powder as large quantities of the flowable material are transferred. As a result, when such flowable material is released from product distribution/transfer tank 121 for bulk filling of storage container/vessel 22, a fine powder may be created. In order to avoid any release of this powder into the ambient air, product distribution/transfer tank 121 incorporates a powder retrieval system which is constructed for cooperation with powder control means associated with product dispensing head assembly 21.

In order to control any powder that is developed within storage container/vessel 22 as the flowable material is being added to container/vessel 22, product dispensing head assembly incorporates an elongated, centrally disposed passageway 125 depicted in phantom in FIG. 15. As shown therein, elongated passageway 125 extends through upper port plate 50, the base of keyway 61 of measuring chamber 55, and the base of keyway shaped lock member 81. In addition, with elongated aperture 125 comprising a diameter substantially smaller than the diameter of flowable material 108, passage of the flowable material through passageway 125 is prevented.

In order to provide controlled removal of any powder developed during the transfer of flowable material 108, key forming post 100 of product distribution/transfer tank 121 comprises an elongated, centrally disposed passageway 122 formed therein positioned for coaxial aligned cooperation with passageway 125 of product dispensing head assembly 21. In addition, in the preferred embodiment, a powder removal conduit 123 is affixed to passageway 122 in order to provide a controlled elongated open zone through which any powdered material can pass from storage container/vessel 22 to the area above flowable material 108 as stored in product distribution/transfer tank 121. Preferably, conduit 123 comprises an elongated flexible tubing member which is easily affixed to the base of product distribution/transfer tank 121 in cooperating, aligned, coaxial relationship with passageway 122 of key forming post 100.

In the preferred embodiment, vacuum means are affixed to the distal end of conduit 123 in order to provide vacuum conditions within conduit 123. In this way, any powder developed within storage container/vessel 22 during the transfer of flowable material 108 will be automatically drawn through passageway 125 of product dispensing head assembly 21, passageway 122 of key forming post 100, and through conduit 123 to an associated storage zone. As a result, assurance is provided that any powder is completely removed from storage container/vessel 22 and any distribution of the powder into the ambient air is prevented.

It will thus be seen that the objects set forth above among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A fully controlled distribution process for preventing unwanted spillage of dry toxic flowable material as well as misuse or mishandling of such material, said process comprising the steps of:

A. distributing the dry toxic flowable material at centrally located distribution centers having at least one enlarged container for housing the dry toxic flowable material;

B. securely affixing a product dispensing head assembly to at least one storage container/vessel in a manner which prevents unauthorized removal thereof;

C. securely affixing a flowable material transfer adaptor to the enlarged container for controlling the gravity feed dispensing of the dry flowable material therefrom;

D. transferring the storage container/vessel with its associated product dispensing head assembly to a centrally located distribution center, matingly interengaging and securely affixing the adaptor of said enlarged container with the product dispensing head assembly of the storage container/vessel for enabling the gravity feed delivery of the dry flowable material from the container directly into the storage container/vessel;

E. arcuately pivoting the storage container/vessel relative to the adaptor for moving said product dispensing head assembly from a first closed position to a second fully open position, thereby enabling the delivery of dry flowable material from said centralized container into said product storage container/vessel in an undiluted, fully concentrated form;

F. disengaging the storage vessel from the adaptor of the centralized container when said storage vessel is completely filled with the desired flowable material;

G. transferring the storage vessel to various desired locations; and

H. dispensing the dry flowable material from the storage vessel into appropriate dilution containers in precisely desired measured quantities consistent with the particular needs and requirements thereof, whereby toxic flowable materials are distributed in complete safety in a closed loop system which assures complete control over the chemical distribution throughout the entire delivery process.

2. The fully controlled distribution process defined in claim 1, wherein a plurality of product dispensing head assemblies are separately mounted to a plurality of storage containers/vessels in a manner which prevents each product dispensing head assembly from being removed from its associated storage container/vessel by unauthorized individuals.

3. The fully controlled distribution process defined in claim 2, wherein each product dispensing head assembly comprises lock means for maintaining the head assembly in its first closed position until activated by a cooperating movement control member.

4. The fully controlled distribution process defined in claim 3, wherein said movement control member is defined as being formed on the transfer adaptor of the enlarged container and constructed for moving the head assembly from its first closed position to its second fully open position during the arcuate pivoting movement of the storage container/vessel relative to the adaptor.

5. The fully controlled distribution process defined in claim 4, wherein said movement control member is further defined as comprising an elongated key forming post constructed for telescopic insertion into a post receiving zone formed in the locking means of the head assembly for disengaging the locking means from its first locked position and enabling the arcuate movement thereof for moving the head assembly into its second fully opened position.

6. The fully controlled distribution process defined in claim 2, comprising the additional step of:
   I. separately repeating steps D through H for each of the plurality of storage containers/vessels for assuring controlled repeated use of said storage containers/vessels, preventing unwanted discarding of said storage containers/vessels with toxic residue retained therein.

7. The fully controlled distribution process defined in claim 1, wherein said product dispensing head assembly comprises a first elongated passageway formed therein and constructed for enabling small, air-bourne particles of the dry flowable material to be drawn therethrough, enabling the removal of such particles from the insertion of the storage container/vessel.

8. The fully controlled distribution process defined in claim 7, and comprising the additional steps of:
   I. mounting vacuum means to the first elongated passageway of the product dispensing head assembly, and
   J. activating the vacuum means during the delivery of the dry flowable material from said centralized container into said product storage container/vessel for preventing the buildup of air-bourne particles and assuring controlled removal of such particles.

9. The fully controlled distribution process defined in claim 7, wherein the transfer adaptor is defined as comprising a second elongated passageway constructed for mating, cooperating alignment with the first elongated passageway at a first end thereof, with the second end thereof being connected to vacuum means.

10. The fully controlled distribution process defined in claim 9, comprising the additional steps of:
   I. aligning the first elongated passageway with the second elongated passageway; and
   J. activating the vacuum means during the delivery of the dry flowable material from said centralized container into said product storage container/vessel for preventing the buildup of air-bourne particles and assuring controlled removal of such particles.

11. The fully controlled distribution process defined in claim 1, wherein said product dispensing head assembly comprises sloping, ramped surfaces peripherally surrounding the entry portals thereof for assuring controlled receipt of all dray flowable material without any buildup on the surfaces thereof.

12. The fully controlled distribution process defined in claim 1, wherein the product dispensing head is further defined as being arcuately movable to enable measured quantities of the dry flowable material to be dispensed therefrom.

13. The fully controlled distribution process defined in claim 12, comprising the additional steps of:
   I. securely affixing an adapter to the dilution container which is constructed for mating engagement with the head assembly of the storage container/vessel;
   J. matingly engaging the head assembly with the dilution container adapter; and
   K. Arcuately pivoting the storage container/vessel relative to the dilution container for dispensing precisely desired, measured quantities of the dry toxic flowable material from the storage container/vessel into the dilution container.

14. A fully controlled distribution process for preventing unwanted spillage of dry toxic flowable material as well as misuse or mishandling of such material, said process comprising the steps of:
   A. distributing the dry toxic flowable material at centrally located distribution centers having at least one enlarged container for housing the dry toxic flowable material;
   B. securely affixing a product dispensing head assembly to at least one storage container/vessel in a manner which prevents unauthorized removal thereof;
   C. securely affixing a flowable material transfer adaptor to the enlarged container for controlling the gravity feed dispensing of the dry flowable material therefrom;
   D. transferring the storage container/vessel with its associated product dispensing head assembly to a centrally located distribution center, matingly interengaging and securely affixing the adaptor of said enlarged container with the product dispensing head assembly of the storage container/vessel for enabling the gravity feed delivery of the dry flowable material from the container directly into the storage container/vessel;
   E. arcuately pivoting the storage container/vessel relative to the adaptor for moving said product dispensing head assembly from a first closed position to a second fully open position, thereby enabling the delivery of dry flowable material from said centralized container into said product storage container/vessel in an undiluted, fully concentrated form;

F. disengaging the storage vessel from the adaptor of the centralized container when said storage vessel is completely filled with the desired flowable material;

G. transferring the storage vessel to various desired locations;

H. dispensing the dry flowable material from the storage vessel into appropriate dilution containers in precisely desired measured quantities consistent with the particular needs and requirements thereof;

I. forming an elongated passageway in the product dispensing head assembly;

J. mounting vacuum means to the elongated passageway; and

K. activating the vacuum means during the delivery of the dry flowable material from said centralized container into said product storage container/vessel for preventing the buildup of air-bourne particles and assuring controlled removal of such particles, whereby toxic flowable materials are distributed in complete safety in a closed loop system which assures complete control over the chemical distribution throughout the entire delivery process.

* * * * *